US010908179B2

(12) United States Patent
Sadeghian Marnani

(10) Patent No.: US 10,908,179 B2
(45) Date of Patent: Feb. 2, 2021

(54) DEVICE AND METHOD FOR MEASURING AND/OR MODIFYING SURFACE FEATURES ON A SURFACE OF A SAMPLE

(71) Applicant: Nederlandse Organisatie voor toegepast-natuurwetenschappelijk onderzoek TNO, 's-Gravenhage (NL)

(72) Inventor: Hamed Sadeghian Marnani, 's-Gravenhage (NL)

(73) Assignee: NEDERLANDSK ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 321 days.

(21) Appl. No.: 15/753,094

(22) PCT Filed: Aug. 18, 2016

(86) PCT No.: PCT/NL2016/050582
§ 371 (c)(1),
(2) Date: Feb. 15, 2018

(87) PCT Pub. No.: WO2017/030441
PCT Pub. Date: Feb. 23, 2017

(65) Prior Publication Data
US 2018/0238931 A1 Aug. 23, 2018

(30) Foreign Application Priority Data
Aug. 19, 2015 (EP) .................................... 15181585

(51) Int. Cl.
*G01Q 70/02* (2010.01)
*G01Q 70/06* (2010.01)
*G01Q 10/02* (2010.01)

(52) U.S. Cl.
CPC ............. *G01Q 70/02* (2013.01); *G01Q 10/02* (2013.01); *G01Q 70/06* (2013.01)

(58) Field of Classification Search
CPC ......... G01Q 70/02; G01Q 70/06; G01Q 10/02
See application file for complete search history.

(56) References Cited

U.S. PATENT DOCUMENTS

| 4,992,660 A | * | 2/1991 | Kobayashi | ............. | G01Q 60/16 250/307 |
| 5,679,952 A | * | 10/1997 | Lutwyche | ............. | B82Y 35/00 850/56 |
| 2011/0227566 A1 | | 9/2011 | Hsieh | | |

FOREIGN PATENT DOCUMENTS

| EP | 1995737 A1 | 11/2008 |
| EP | 2682759 A1 | 1/2014 |

(Continued)

OTHER PUBLICATIONS

Office Action with Search Report from Taiwanese Patent Appl. No. 105126117, pp. 1-9.

*Primary Examiner* — Randy W Gibson
*Assistant Examiner* — John M Royston
(74) *Attorney, Agent, or Firm* — Hoffmann & Baron, LLP

(57) ABSTRACT

The present document describes a device for measuring and/or modifying surface features and/or sub-surface features on or below a surface of a sample. The system comprises a sample carrier, one or more heads, and a support structure. The support structure comprises a reference surface for providing a positioning reference. The heads are separate from the sample carrier and the support structure, and the device further comprises a pick and place manipulator arranged for positioning the heads at respective working positions. The manipulator comprises a gripper and an actuator for moving the gripper, wherein the actuator is arranged for providing a motion in a direction transverse to (Continued)

the reference surface. The gripper is arranged for engaging and releasing the respective heads from the transverse motion. The document also describes a method of measuring and/or modifying surface features on a surface of a sample.

15 Claims, 8 Drawing Sheets

(56) References Cited

FOREIGN PATENT DOCUMENTS

| | | | |
|---|---|---|---|
| JP | 2000171472 | A | 6/2000 |
| JP | 2001235416 | A | 8/2001 |
| TW | 200512445 | A | 4/2005 |
| TW | 201132970 | A | 10/2011 |
| WO | 2014003557 | A1 | 1/2014 |
| WO | 2015019090 | A1 | 2/2015 |

* cited by examiner

DEVICE AND METHOD FOR MEASURING AND/OR MODIFYING SURFACE FEATURES ON A SURFACE OF A SAMPLE

This application is the U.S. National Phase of, and Applicant claims priority from, International Patent Application Number PCT/NL2016/050582 filed 18 Aug. 2016, which claims priority from EP 15181585.9 filed 19 Aug. 2015, each of which is incorporated herein by reference.

FIELD OF THE INVENTION

The present invention is directed at a device for measuring and/or modifying surface features and/or sub-surface features on or below a surface of a sample, the system comprising: a sample carrier for supporting the sample for exposing the surface for enabling said measuring and/or modifying, one or more heads including at least one of surface measuring equipment or surface modification equipment, and a support structure for supporting the one or more heads, wherein the support structure comprises a reference surface for providing a positioning reference for enabling positioning of each of said one or more heads at a respective working position. The invention is further directed at a method using a device as defined above.

BACKGROUND

A scanning probe microscopy device serves to map nanostructures on a sample surface of a sample. Such a device may comprise a probe for scanning the surface of an object, and one or more motion actuators for enabling motion of the probe relative to the sample. In one embodiment a probe comprises a probing tip mounted on a cantilever arranged for bringing the probing tip in contact with the sampling surface for enabling the scanning, and a Z-position detector for determining a position of the probing tip along a Z-direction when the probing tip is in contact with the sample surface (herein the Z-direction is a direction transverse to the sample surface).

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, measurements with a microscopic probe may be used for critical metrology (CD-metrology), profilometry, particle scanning and defect review, stress- and roughness measurements. AFM microscopy allows visualization of surfaces at very high accuracy, enabling visualization of surface elements at sub-nanometer resolution.

The very high resolution and accuracy of a microscopic probe however comes at the cost of performance in terms of throughput. Throughput scales with the ratio of object area and the area of the smallest details that can be resolved with the microscopic probe. For object of macroscopic dimensions this results in significant processing time, which may be unrealistic or at least cumbersome for practical use and altogether incompatible with on line use in manufacturing processes.

High throughput scanning probe microscopy devices are nowadays available wherein a plurality of sensor heads may be positioned relative to a sample surface by means of a number of arms. Although a plurality of sensor heads may be applied simultaneously for scanning, thereby increasing the efficiency and throughput, a further increase in efficiency and throughput is desired e.g. for use in an industrial manufacturing process.

SUMMARY OF THE INVENTION

It is an object of the present invention to provide a high throughput device and method for measuring and/or modifying surface features and/or sub-surface features on or below a surface of a sample.

There is provided herewith a, in accordance with a first aspect, a device for measuring and/or modifying surface features and/or sub-surface features on or below a surface of a sample, the system comprising: a sample carrier for supporting the sample for exposing the surface for enabling said measuring and/or modifying, one or more heads including at least one of surface measuring equipment or surface modification equipment, and a support structure for supporting the one or more heads, wherein the support structure comprises a reference surface for providing a positioning reference for enabling positioning of each of said one or more heads at a respective working position, wherein the heads are separate from the sample carrier and the support structure such as to be not connected thereto, and wherein the device further comprises a pick and place manipulator arranged for gripping of respective ones of the heads and positioning thereof at their respective working positions, wherein the manipulator comprises a gripper and an actuator for moving the gripper and the reference surface relative to each other, wherein the actuator is arranged for providing a motion in a direction transverse to the reference surface, and wherein the gripper is arranged for engaging and releasing the respective heads from the transverse motion.

The terms 'surface features' and 'sub-surface features' relates to any features that are on or below the surface of a sample and that may be sensed and/or modified. Such features may be structural features, such as height differences, ridges, holes, protrusions, indentations or the like. Such features may also include structures of different materials or internal structures or layers in a sample. The terms also include any other mechanical, electrical, and/or chemical properties of the surface or below the surface of the sample that may be measurable and/or modifiable. Examples are scanning probe microscopy (SPM) of surface or subsurface features, such as atomic force microscopy (AFM), electrical properties measurement via scanning capacitance force microscopy, measuring elasticity and stiffness via force spectroscopy or contact resonance method, measuring the thermal properties via scanning thermal probe microscopy, etc.

In the device of the present invention, a pick and place manipulator is arranged for picking up each of the individual heads (e.g. sensor heads or processing heads) and placing them in a respective working position. The heads may be placed close to each other on the support structure such as to allow measuring or modifying the surface features in a plurality of locations simultaneously. The locations may be arranged close to each other side by side, in a dense arrangement.

In particular in the device of the present invention, the gripper of the manipulator is moved by the actuator in the direction transverse to the reference surface of the support structure. Therefore, the gripper picks up each of the heads from above, lifting the heads up and moving them to the desired working positions. In some embodiments, because the desired working positions are known (or even monitored) and the actual locations of the heads are measured, the positioning system may be a closed loop positioning system. The respective heads are then lowered (also in the transverse direction) to be placed on the support structure. The heads may for example be placed directly on the reference surface of the support structure, although placement on a different surface may also be performed where desired. As a result of enabling the lifting and lowering of the heads in a transverse direction to the reference surface, the heads can be placed close to each other side by side, because the placing of the heads is not hindered by any obstacles in this dimension. Moreover, in absence of a robotarm or any other manipulator that picks up the heads from the side, the heads do not need to be equipped with an adaptor or any other structure. This further reduces the size of the heads in the lateral direction. Therefore the footprint of the heads, and the footprint of the heads including the space required for placing of the heads can be kept as small as possible. Thus a large number of heads can be placed side by side on the reference surface, allowing simultaneous measurement in a dense formation.

In accordance with an embodiment of the present invention the support structure is movable relative to the sample carrier at least in a direction parallel to the reference surface, the device further comprising a stage actuator for moving the support structure relative to the sample carrier and the manipulator, the stage actuator being arranged for moving the support structure between at least a first position allowing said measuring and/or modifying of the surface features, and a second position allowing placement and removal of the heads onto and from said working positions.

In this embodiment, the heads may be placed by the manipulator on the support structure in the second position, after which the support structure is moved to the first position wherein the measurement and/or modifying of the surface features may be performed.

For example, in an embodiment wherein the sample carrier holds the sample with the surface to be processed facing down, the support structure on which the processing heads have been placed in a dense formation may be moved underneath the sample carrier to perform measurement and/or modifying of the surface features on the surface of the sample from below.

In accordance with a further embodiment of the present invention the gripper comprises, for engaging with the respective heads, at least one of: clamping elements such as suction clamps, magnetic clamping elements, electrostatic clamping elements or flexible clamping elements, flexible or rotatable fingers for gripping; or gravity based engagement elements, such as structural features, a ridge, a hook, an edge, a slot, for cooperating with a structure of the respective heads. As will be appreciated a gripper may be designed in a number of manners for picking and placing the heads in a vertical direction onto the surface. Also combinations of the abovementioned elements may be used together to allow gripping of the heads.

In accordance with yet other embodiments of the present invention the one or more heads comprise at least of an engagement opening or engagement element, said engagement opening or engagement element arranged on an upper side of the heads, and wherein the gripper comprises at least one other of said engagement opening or engagement element, wherein the engagement opening and engagement element are mutually corresponding such as to allow receiving of the engagement element in the engagement opening for enabling said engaging. In these embodiments, the engagement opening or engagement element on the heads is arranged on an upper side of the head. In particular, this prevents having to engage the heads from the side, and it thus even further reduces the size of the footprint of the head and the space required for placing the head on the surface. In this embodiment, the heads may in principle be placed directly adjacent one another, and potentially even in abutment against each other.

Yet in accordance with some embodiments the gripper comprises a rotatable extension comprising the engagement element, and wherein the engagement element and the engagement opening are correspondingly shaped in such a manner that the engagement element fits through the engagement opening in a first rotational position of the engagement element while enabling said engaging in a second rotational position of the engagement element. In these embodiments, the engagement element and the engagement opening, which are correspondingly shaped, are aligned with each other and the engagement element is extended through the engagement opening. Then, the engagement element and engagement opening may be rotated relative to each other such that the engagement element no longer aligns with the opening. This allows the gripper to pick up the head and move it to the respective working position. Placing of the head may be performed in the reverse order: lowering the head, rotating the engagement element relative to the engagement opening such as to align both, and moving the element back through the opening to release the head. In accordance with yet another embodiment the engagement element and the engagement opening are shaped as a polygon, such as a triangle, a square, or rectangle, a pentagon, a hexagon, a heptagon, a octagon, or another polygon.

Yet in accordance with other embodiments, the gripper and the heads comprise a mutually cooperating engagement structure forming a kinematic mount, the kinematic mount including at least three structural elements arranged on either one of the gripper or the heads, said at least three structural elements cooperating with at least three slots arranged on another one of the gripper or the heads. The use of a kinematic mount during placement of each of the respective heads, allows to place these heads at the respective working positions with high accuracy and prevents slipping of the heads during placement thereof. The reference surface may consist of an optical reference grid that is very sensitive, and may easily damage as a result of slipping. A kinematic mount usually applies three structural elements cooperating with three slots and is designed such that during placement of the component none of the geometric dimensions is overconstrained or underconstrained, thereby preventing slipping.

In accordance with some specific embodiments wherein the engagement elements and the engagement opening are shaped as a polygon, the at least three structural elements or at least three slots are arranged in one or more corners of said polygon shape of the engagement element and the engagement opening. For example, in an embodiment wherein the engagement element and the engagement opening are shaped as a triangle, the structural elements may be located near the corners of the triangle on the engagement element. The corresponding slots of the kinematic mount may then for example be located around the periphery of the engagement opening between each two corners of the triangle. The engagement element may then be inserted into the engagement opening, and rotated such as to align the at least three structural elements with the at least three slots following the kinematic mount. These embodiments allow to combine the benefits of having a very small footprint, and enabling accurate placing of the heads without slipping.

In accordance with yet other embodiments that comprise a kinematic mount as described hereinabove, the gripper is arranged for maintaining the heads in the tilted orientation relative to the reference surface during motion of the heads towards and away from the support structure. By maintaining the heads in a slightly tilted orientation relative to the reference surface, upon lowering of the heads towards the support structure, the three structural elements of the kinematic mount will be released from their associated slots subsequently, depending on which part of the head touches the surface of the support structure. This allows highly accurate placement of the head onto the surface.

In accordance with yet a further embodiment thereof, the gripper comprises three fingers, each finger comprising a clamping member for defining a contact point with a respective head during said engaging, wherein each of said fingers is connected to the gripper via a releasable connection, wherein the releasable connection is operable via mechanical contact transfer through the respective finger for allowing fixation or movement of the finger with respect to the gripper dependent on contact of the respective head with the support structure. In this embodiment, the slots and structural contact elements of the kinematic mount may for example be located in the releasable connection of each of the three fingers with the gripper. The structural elements of the kinematic mount may be released from their slots by means of mechanical contact transfer: once contact is made by a part of the head with the surface of the support structure, forces between the head and the associated finger which is associated with the part being in contact with the surface may result in the releasable connection to be released such as to release the action of the finger on the head. Thus, each of the three fingers is released upon contact of an associated part of the head with the support structure. This release of the releasable connection may result in e.g. retracting of the finger or rotation away from the head, or a different action causing the head to be released.

In accordance with a specific embodiment, the releasable connection may be a magnetic or electrostatic element. The magnetic or electrostatic force of the element may be relatively weak, such as to immediately release the finger upon contact of the head with the surface of the support structure.

The device in accordance with any of the embodiments provided hereinabove, may for example, be a scanning probe microscopy device, such as an atomic force microscopy device. However, the invention is not limited to use in scanning probe microscopy devices, or microscopy devices in general, and may be applied to other type of devices wherein surface features, such as nanostructures, on the surface of a sample may be examined or modified during operation.

Furthermore, in accordance with a further aspect, there is provided a method of measuring and/or modifying surface features and/or sub-surface features on or below a surface of a sample, wherein the method is performed using a device comprising: a sample carrier for supporting the sample, a support structure comprising a reference surface, and one or more heads including at least one of surface measuring equipment or surface modification equipment, the heads being separate from the sample carrier and the support structure; the method comprising: placing, using a pick and place manipulator, the one or more heads at a plurality of working positions on the support structure; and performing said measuring and/or modifying of surface features by said surface measuring equipment or surface modification equipment on said heads; wherein the step of placing the one or more heads comprises: engaging with a respective one of the heads using a gripper; moving the gripper and the reference surface relative to each other using an actuator of said manipulator, in a direction transverse to the reference surface; and releasing the respective heads from the gripper at the respective working positions.

In accordance with an embodiment of the second aspect, the method further comprises, prior to the step of performing the measurement of modification of the surface features, moving, using a stage actuator, the support structure relative to the sample carrier in a direction parallel to the reference surface, said moving being performed between at least a first position allowing said measuring and/or modifying of the surface features, and a second position allowing placement and removal of the heads onto and from said working positions.

Yet in accordance with further embodiments of the invention, a step of engaging comprises receiving an engagement element of at least one of the gripper or the respective head in a correspondingly shaped engagement opening in another one of the gripper or the respective head, said respective one of the engagement element or engagement opening being located on an upper side of the heads.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
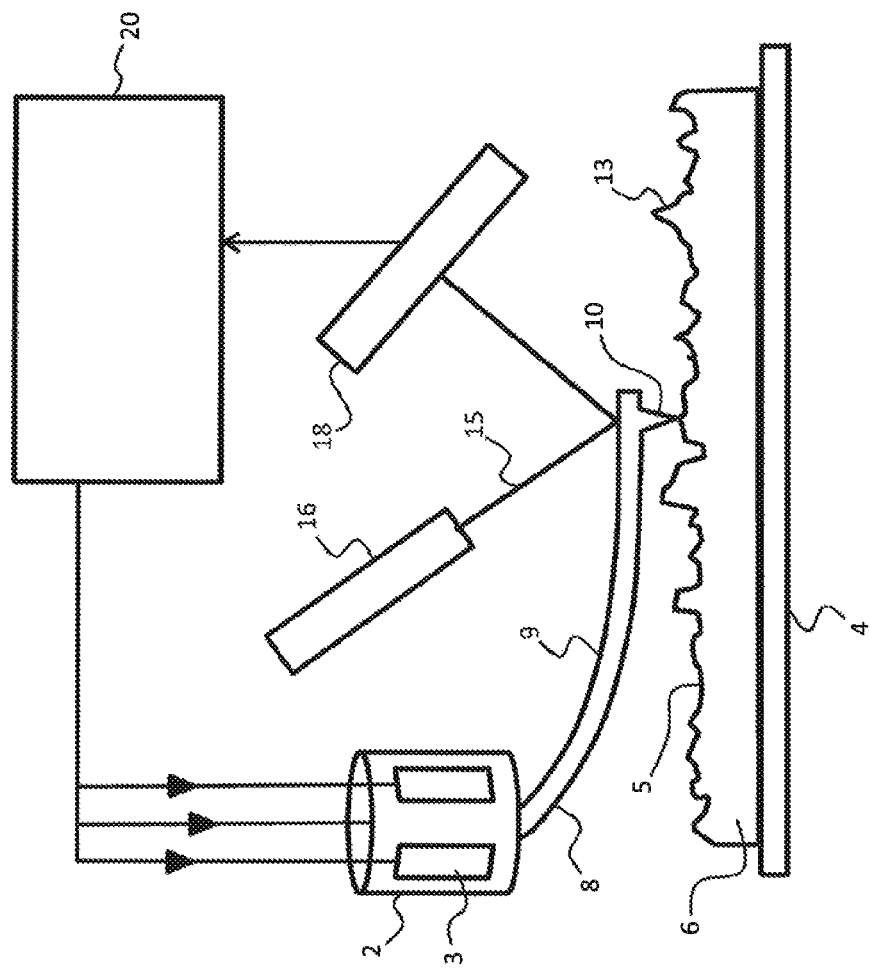
FIG. 1 schematically illustrates the working principle of a typical prior art atomic force microscope.

FIG. 1 schematically illustrates the working principle of a typical prior art atomic force microscope. In FIG. 1, a probe head 2 comprises piezo type drivers 3 for the X-, Y-, and Z-directional motion of a probe 8. The probe 8 consists of a cantilever 9 having a probe tip 10 arranged for scanning a sample surface 5 of a sample 6. During scanning, a dither piezo (not shown) or other means of actuations such as photo-thermal actuation, electrostatic, etc, may drive the cantilever in vibrational mode (for example close to resonant frequency) to enable tapping of the probe tip on the surface. The manner of applying a vibrational motion to the probe tip is known to the skilled person.

Scanning of the sample surface 5 is performed by moving the probe tip 10 in the X- and Y direction parallel to the sample surface 5 (or alternatively, by moving the substrate surface in the X- and Y-directions while maintaining the position of the probe tip fixed in the X- and Y-directions). The probe tip 10 is brought in close proximity to the surface 5 by means of a z-directional piezo driver. Once in the position, the probe tip 10 is vibrated in the z-direction such that it repeatedly touches the surface 5 during scanning thereof. At the same time, a laser 16 illuminates the probe tip with laser beam 15. The precise position in the z-direction is determined using photo diodes 18 which receive the reflected laser beam 15.

The sample surface 5 is carried using a sample carrier 4. Driving of the piezo drivers 3 located on the probe head 2 is performed using the detector and feedback electronics 20. At the same time, the detector and feedback electronics 20 receive the detected z position as determined using photo diodes 18. This principle allows for very precise mapping of surface elements, such as surface element 13 on the surface 5 of the sample 6. Atomic force microscopy performed e.g. using a technique as illustrated in FIG. 1 allows the mapping of very small structures and features on the surface, e.g. nanostructures having typical nanometer dimensions (e.g. even <1 nm, such as for example individual polymer strings being as thin as 0.4 nm). As described herein above, since the mapping of the surface has to be performed with great precision, the speed at which the method is performed is rather slow.

The present invention, however, is not limited to atomic force microscopy, but may also be applied in combination with other scanning probe microscopy methods and/or processes for modification of such small scale surface features. The present invention allows to greatly improve this performance by enabling the simultaneous mapping of surface features in a plurality of locations of a surface 5 of a substrate or sample 6. In this respect, the invention proposes to deploy a plurality of sensor heads at multiple locations on a support structure surface, e.g. a reference surface including a reference grid. A scanning motion may then be provided by scanning the whole sample relative to the sensor heads, or in a different suitable manner.

Figure 2A:
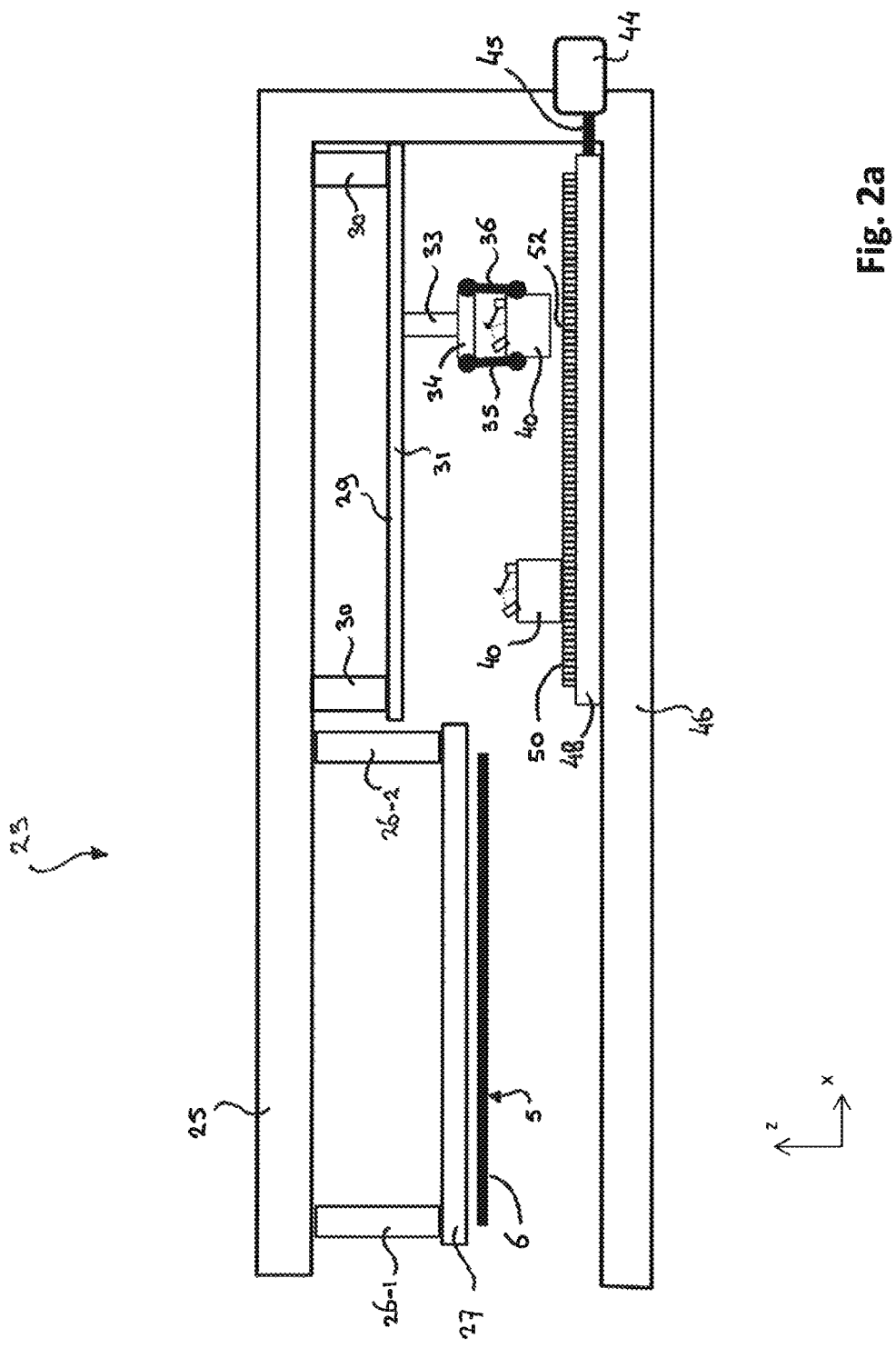
FIGS. 2a and 2b schematically illustrate an embodiment of the present invention.

In FIG. 2a, an atomic force microscopy apparatus 23 comprises a metrology frame 25. Suspending from the metrology frame 25 is a sample carrier 27, which is attached to the metrology frame via a plurality of positioning actuators 26-1 and 26-2 for positioning the sample carrier 27 e.g. at a correct height level for performing measurements. The sample carrier 27 carries a wafer 6, the surface 5 of which has to be inspected by means of atomic force microscopy. Various methods are available to the skilled person for suspending the wafer 6 from the sample carrier 27. For example, the sample carrier may comprise different types of clamps such as suction clamps or mechanic clamps or the like.

In a different part of the apparatus 23, a support structure 48 holding a reference surface 50 comprising an optical reference grid is held in place underneath a manipulator 29. The manipulator 29 comprises a movable frame structure 30 including a rail 31. The movable frame structure 30 can be moved parallel to the reference surface 50, e.g. in a direction out of and in to the paper. This allows a manipulator arm 33 comprising a gripper 34 to reach any desired location on the reference surface 50 (as long as support structure 48 is positioned underneath the manipulator 29). The manipulator 29 allows to pick up each of a plurality of sensor heads 40 from a storage location, and place the respective head 40 onto a desired working position 52 on the reference surface 50. In FIG. 2a, one of the sensor heads 40 already resides in its desired working position on the reference surface 50, and the other sensor head 40 is being lowered towards the desired working position 52.

While handling the sensor heads 40, the gripper 34 holds the sensor heads 40 by means of a clamping mechanism including clamping elements 35 and 36. In the embodiment illustrated in FIG. 2a, the clamping elements 35 and 36 are rotatable fingers that can rotate around a hinge located at the base of gripper 34. Once the manipulator 29 has placed all the sensor heads 40 onto the reference surface 50, the stage actuator 44 allows to move the support structure 48 towards the measurement position underneath the wafer 6. This may be performed by the stage actuator 44 by extending the extension arm 45. The skilled person may appreciate that a large number of alternative methods exist for moving the support structure 48 from its first position underneath the manipulator 29 towards its second position underneath the sample holder 27. Thus, instead of the stage actuator 44 having an arm 45, a complete different type of stage actuator mechanism may be implemented. For example, it is also possible that the support stage 48 is self propelled, or can be hovered across the surface of the lower part 46 of the metrology frame 25 by means of an air bearing or magnetic levitation. Also, the metrology frame 25 in its lower part 46 may comprise rails, with or without bearings, to move the support structure 48 to its second position. The skilled person may recognize alternative solutions that may be applied for moving the support structure 48, without departing from the invention.

Figure 2B:
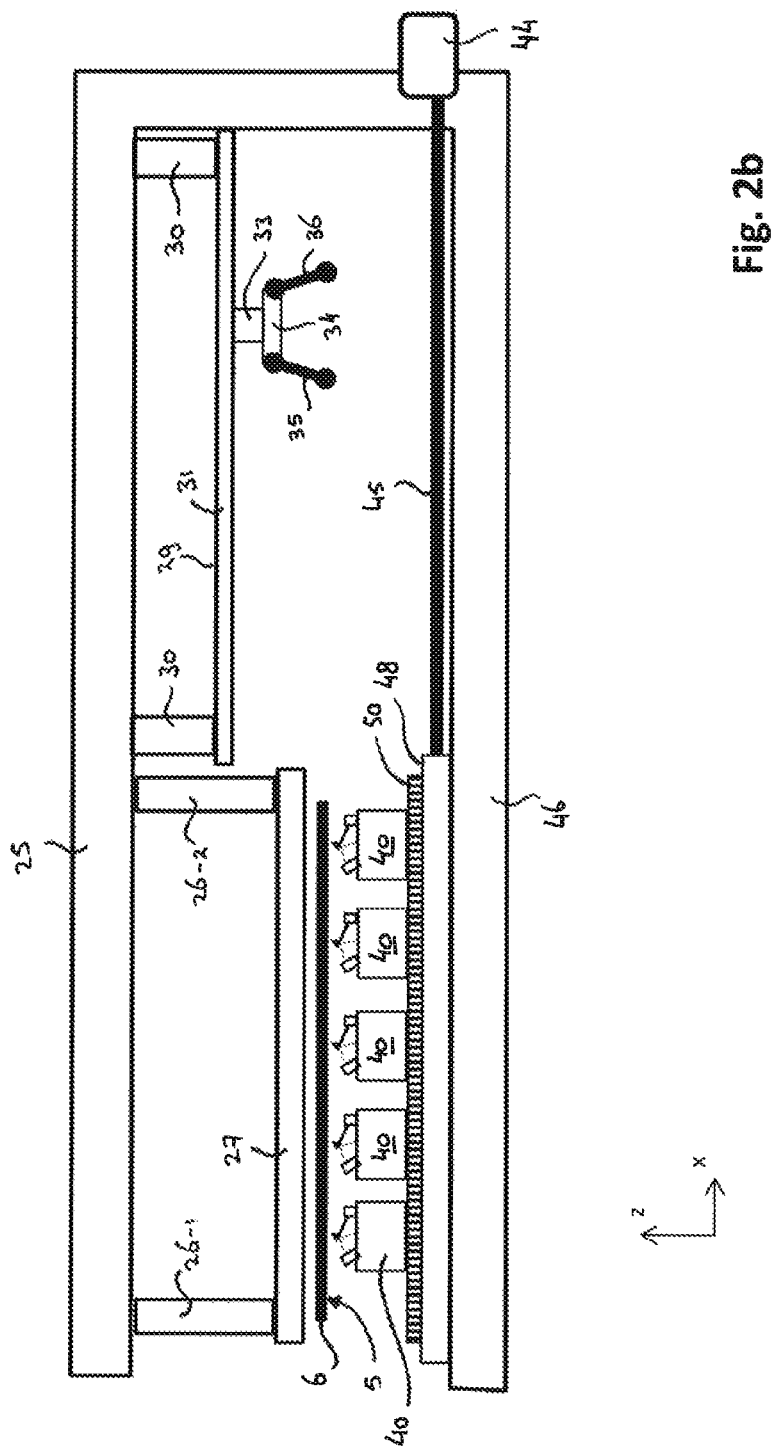
Figure 3:
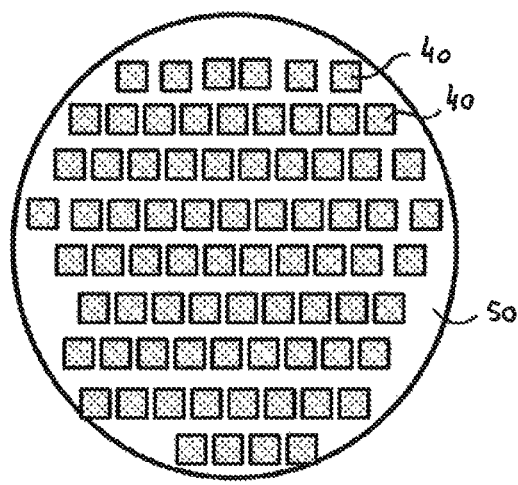
FIG. 3 schematically illustrates the density of measurement locations achievable using a device or system in accordance with the present invention.

In FIG. 2b, the support stage 48 is positioned in its second position underneath the sample carrier 27. As follows from FIG. 2b, onto the reference surface 50 a plurality of sensor heads 40 has been placed by the manipulator in a first position. Although FIG. 2b schematically illustrates five sensor heads, the sensor heads can be placed by the manipulator in a very compact arrangement on the reference surface, and therefore the amount of sensor heads 40 located on the reference surface 50 may be much larger than as suggested in FIG. 2b. For example, a dense arrangement of sensor heads 40 is also illustrated in FIG. 3 showing a reference surface 50 from above, wherein the sensor heads 40 are illustrated as squares. As can be seen, even in the dense arrangement illustrated in FIG. 3, the density of the number of sensor heads 40 on the surface 50 of the wafer can be increased as long as the footprint for placing of the sensor heads 40 can be decreased.

Back to FIG. 2b, the support structure 48 is located underneath the sample carrier 27 carrying the wafer 6. The sample carrier 27, after positioning of the support structure 48 in its second position by means of the actuator 44 and the extension arm 45, may have been lowered such that each of the probes on the sensor heads 40 is able to accurately perform measurements on the surface. As will be appreciated, it is very important that the surface 5 of the wafer 6 is kept level within measurable range of each of the probes of the sensor heads 40. Because accuracy on a nanometer scale may be desired, various technologies may be applied for slightly adjusting the height of a probe of one of the sensor heads 40 to the correct level relative to the surface 5 of the wafer 6 locally at the working position of the sensor head 40. For example, each of the sensor heads 40 may comprise an additional piezo actuator which allows to adjust the z-position of the probe. The overall levelling of the whole wafer 6 relative to the sensor heads 40 may be adjusted by means of the actuators 26-1 and 26-2 of the sample carrier 27. As will be appreciated, the drawing of FIG. 2*b* is a two dimensional schematic drawings, and in reality a third or even a fourth adjustment actuator 26 may be used to generally align the wafer with the position of the probes or the sensor heads 40.

Various methods may be applied by the manipulator 29 to place the sensor heads 40 onto the reference surface 50 on the support structure 48. A plurality of different placement methods is schematically illustrated in FIGS. 4 through 10 and will be discussed hereinbelow. Each of the FIGS. 4, 5, 6, 7, 8, 9*b* and 10 shows the gripper 34 of the manipulator 29 in a first mode A wherein it is holding the sensor head while placing it onto the surface 50, and in a second mode B wherein it has released the sensor head 40 in the correct working position 52. As may be appreciated, in order to move the gripper 34 and the reference surface 50 relative to each other, the manipulator may be arranged for moving either one or both of these elements. Thus, the manipulator may comprise an actuator for moving the gripper 34 or for moving the support structure 48 comprising reference surface 50, or both, in a direction parallel to the reference surface 50. Also the gripper 34 may be lowered towards the reference surface 50, or the support structure 48 comprising the reference surface 50 may be raised, in order to place the heads onto the reference surface 50. The skilled person is able to select a most suitable implementation of the invention without departing from the scope thereof.

Figure 4:
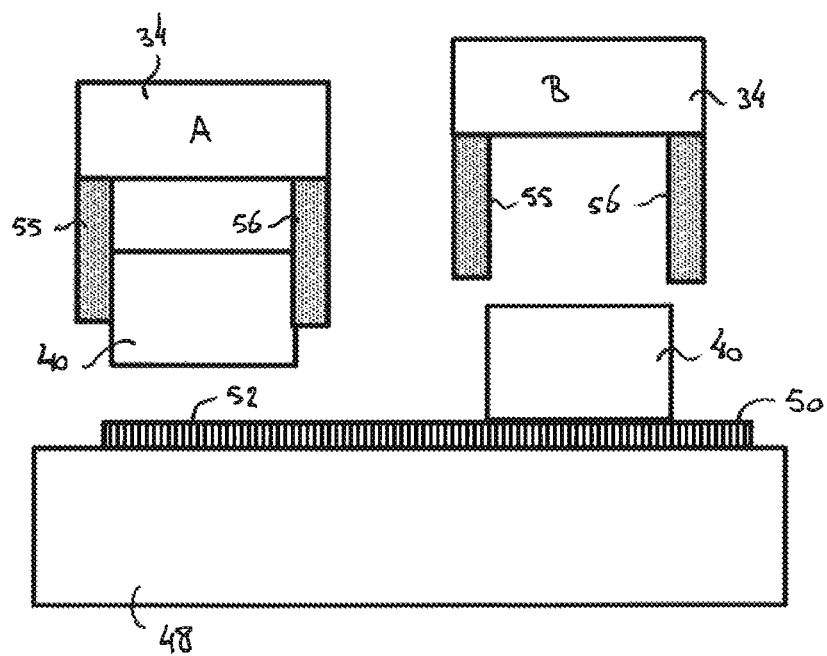
FIG. 4 schematically illustrates an embodiment of a method of positioning a sensor head on a reference grid, in accordance with the present invention.

The example illustrated in FIG. 4 shows a gripper 34 comprising flexible clamping elements 55 and 56 that support the sensor head 40 during handling around a substantial part (or all) of its periphery. To place the sensor head 40 onto the surface 50 and release the flexible clamping elements 55 and 56 from the sensor head 40, a force may be applied between the sensor head 40 and the reference surface 50 which is large enough to pull the sensor head 40 from the clamping elements 55 and 56. For example, a magnetic force may be applied (not shown) between the sensor head 40 and the support structure 48 through the reference frame 50, once the sensor head 40 has been placed onto the reference surface 50.

Figure 5:
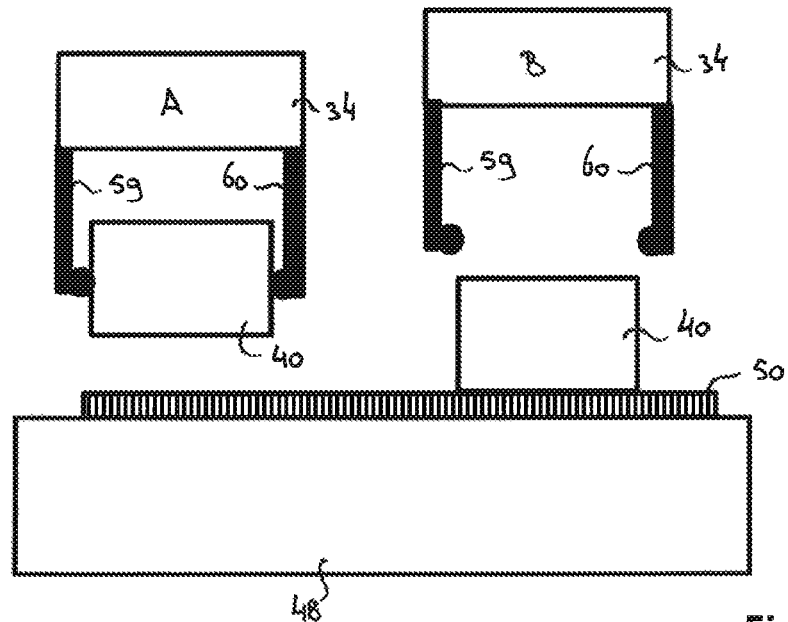
FIG. 5 schematically illustrates an embodiment of a method of positioning a sensor head on a reference grid, in accordance with the present invention.

In a further embodiment illustrated in FIG. 5, the gripper 34 holds the sensor head 40 by means of clamping elements 59 and 60. Although FIG. 5 is illustrated in cross section, the gripper 34 may comprise three clamping elements such as 59 and 56 to support the sensor head 40 in three positions around its periphery. In some embodiments, these three clamping locations may form a kinematic mounting structure.

Figure 6:
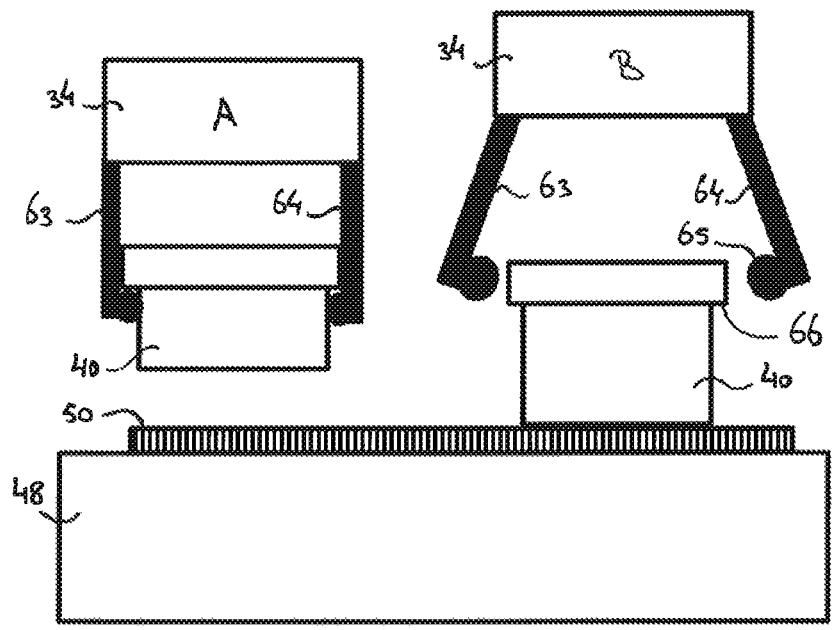
FIG. 6 schematically illustrates an embodiment of a method of positioning a sensor head on a reference grid, in accordance with the present invention.

In FIG. 6, the gripper 34 comprises rotatable fingers 63 and 64. The fingers comprise structural elements such as ball contact 65 that cooperates with an edge or slot 66 on the sensor head 40. After placing of the sensor head, as illustrated in mode B, the fingers 63 and 64 rotate outward to release the sensor head 40 from the gripper 34.

Figure 7:
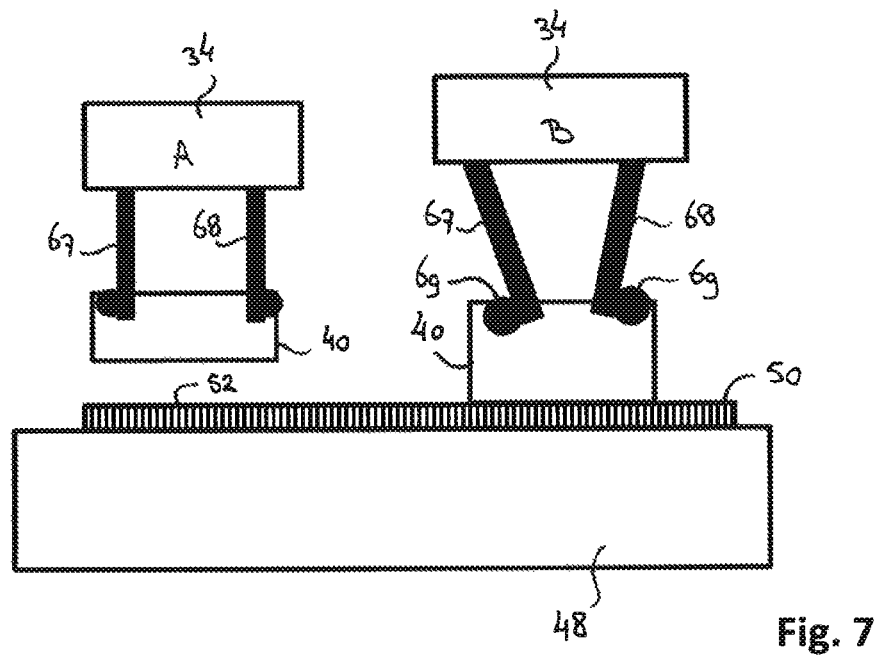
FIG. 7 schematically illustrates an embodiment of a method of positioning a sensor head on a reference grid, in accordance with the present invention.

In the embodiment of FIG. 7, gripper 34 also comprises rotatable fingers 67 and 68, however these rotatable fingers 67 and 68 rotate slightly inwards after placing of the sensor head 40 in mode B. The engagement elements 69 at the ends of fingers 67 and 68 may for example cooperate with engagement openings in the upper part of the sensor head 40 to allow gripping by gripper 34.

Figure 8:
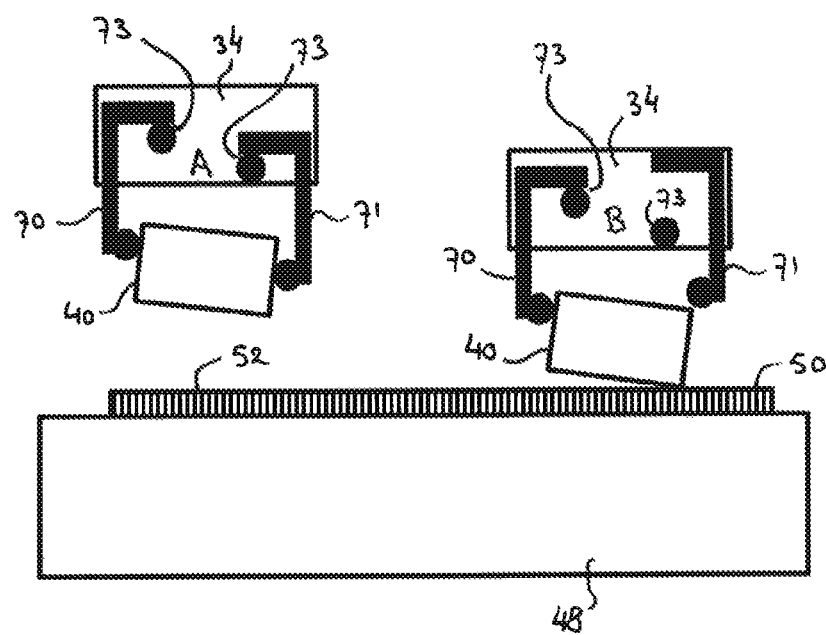
FIG. 8 schematically illustrates an embodiment of a method of positioning a sensor head on a reference grid, in accordance with the present invention.

In the embodiment illustrated in FIG. 8, the gripper 34 also comprises fingers 70 and 71, which are connected to the gripper by means of releasable connections 73. In mode A, the releasable connections 73 retain the end parts of fingers 70 and 71. As follows from mode B, once that one part of the sensor head 40, associated with clamping element 71, touches the reference surface 50, the releasable connection 73 releases the clamping element 71 by means of mechanical contact transfer. Mechanical contact transfer relates to the actuation of an element responsive to a mechanical contact in a different part of that element or the device wherein it is implemented. In the present case, the sensor head 40 touching the reference surface 50 changes the force equilibrium at the clamping element 71 and the releasable connection 73, such that the releasable connection 73 is released. For example, element 73 may be a weak magnet, and the end of contact element 71 is slightly biased by means of a spring force in a direction pulling it away from releasable connection 73. While sensor head 40 is being held by the gripper 34 (e.g. as illustrated in mode A), the gravitational force is sufficiently strong for pulling the weakly biased contact element 71 towards the releasable connection 73, wherein it is held in place by the magnet. Upon touching of the reference surface 50, a gravitational force decreases, and the releasable connection releases the clamping element 71, which is pulled back by the spring force. Damping of the spring may be added to prevent a too violent motion of the clamping element 71.

Figure 9A:
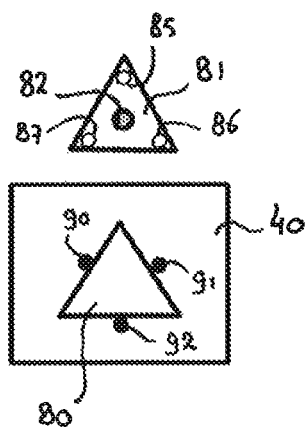
FIGS. 9a and 9b schematically illustrate an engagement element and an embodiment of a method of positioning a sensor head on a reference grid, in accordance with the present invention.

In FIG. 9*a*, a more sophisticated engagement element 81 is illustrated. Engagement element 81 suspends from a rotational extension arm 82. In the corners of the triangular shaped engagement element 81, there is located three slots 85, 86 and 87. The upper part of sensor head 40 is also illustrated in FIG. 9*a*, comprising an engagement opening 80. The shape of the engagement opening 80 corresponds with the shape of the engagement element 81 in such a manner that the engagement element 81 fits through the engagement opening 80. Internally within the sensor head 40, three ball contacts 90, 91 and 92 are located on the periphery of the engagement opening 80 in the middle between the corners thereof. By extending the engagement element 81 through the engagement opening 80, and rotating it over 60°, the slots 85, 86 and 87 align with the ball contacts 90, 91 and 92 respectively, and pulling the engagement element 81 upward will lift the sensor head 40. In particular, the ball of contacts 90, 91 and 92 and corresponding slots 85, 86 and 87 together form a kinematic mounting which is designed for maintaining the sensor head 40 in place without over constraining or under constraining it in any dimension (x, y, z, Rx, Ry, Rz; wherein Rx through Rz are the rotation directions around axes parallel to the x, z, x axis).

Figure 9B:
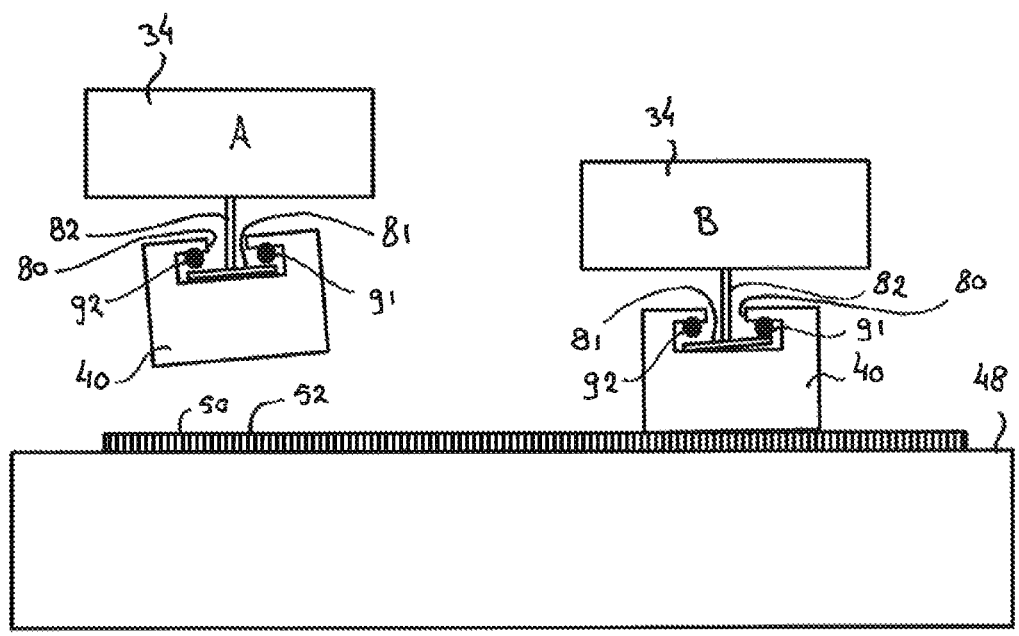

FIG. 9*b* schematically illustrate how the cooperating engagements element 81 and engagement opening 80 work together to allow accurate placement of the sensor head 40 on the reference surface 50. In mode A, gripper 34 has extended the engagement element 81 through the engagement opening 80, and it is held in place by means of the kinematic mount of which the ball contacts 91 and 92 are shown in the figure. The sensor head 40 is held in a slightly tilted manner such that one point of the sensor head 40 will first touch the reference surface 50. When this happens, as illustrated in mode B, the first of the ball contacts 92 comes free from the slot 87. During placement of the sensor head 40 onto the reference surface 50, the three ball contacts 90, 91 and 92 will subsequently be released from the associated slots 85, 86 and 87.

Figure 10:
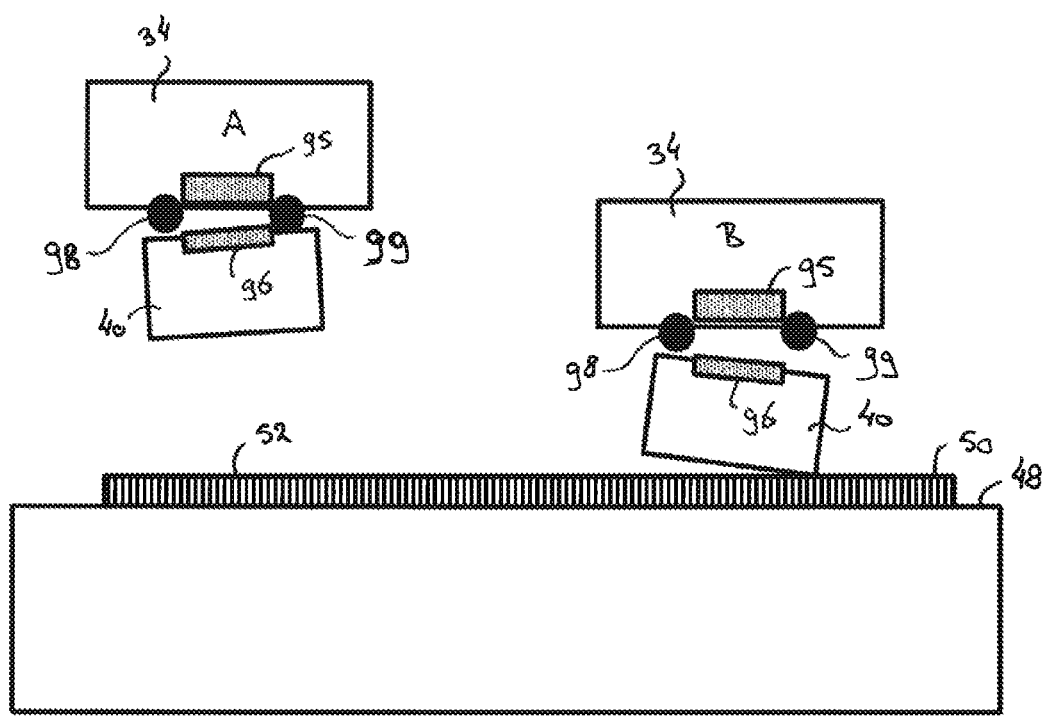
FIG. 10 schematically illustrates an embodiment of a method of positioning a sensor head on a reference grid, in accordance with the present invention.

A further embodiment is illustrated in FIG. 10. Here, the gripper 34 comprises clamping elements consisting of a magnet 85 acting upon a counter element 96 held by the sensor head 40. The gripper 34 further comprises ball contacts 98, 99 (and a third ball contact (not shown)) falling into associated slots on the sensor head 40. Upon placing the sensor head 40 onto the reference surface 50, magnet 95 is operated to release the sensor head. Alternatively, each of the contact elements 98 and 99 is magnetic, and can be released subsequently as is illustrated in FIG. 10 in mode B.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A device for measuring and/or modifying surface features and/or sub-surface features on or below a surface of a sample, the system comprising:
    a sample carrier for supporting the sample for exposing the surface for enabling said measuring and/or modifying, one or more heads including at least one of surface measuring equipment or surface modification equipment, and a support structure for supporting the one or more heads, wherein the support structure comprises a reference surface for providing a positioning reference for enabling positioning of each of said one or more heads at a respective working position,
    wherein the heads are separate from the sample carrier and the support structure such as to be not connected thereto, and wherein the device further comprises a pick and place manipulator arranged for gripping of respective ones of the heads and positioning thereof onto the reference surface at their respective working positions,
    wherein the manipulator comprises a gripper and an actuator for moving the gripper and the reference surface relative to each other, wherein the actuator is arranged for providing a motion in a direction transverse to the reference surface, and wherein the gripper is arranged for engaging and releasing the respective heads from the transverse motion for placing the heads onto the reference surface.

2. Device according to claim 1, wherein the support structure is moveable relative to the sample carrier at least in a direction parallel to the reference surface, the device further comprising a stage actuator for moving the support structure relative to the sample carrier and the manipulator, the stage actuator being arranged for moving the support structure between at least a first position allowing said measuring and/or modifying of the surface features, and a second position allowing placement and removal of the heads onto and from said working positions.

3. Device according to claim 1, wherein for engaging with the respective heads, the gripper comprises at least one of: clamping elements such as suction clamps, magnetic clamping elements, electrostatic clamping elements, or flexible clamping elements, flexible or rotatable fingers for gripping; or gravity based engagement elements, such as structural features, a ridge, a hook, an edge, a slot, for cooperating with a structure of the respective heads.

4. Device according to claim 1, wherein the one or more heads comprise at least one of an engagement opening or engagement element, said engagement opening or engagement element arranged on an upper side of the heads, and wherein the gripper comprises at least one other of said engagement opening or engagement element, wherein the engagement opening and engagement element are mutually corresponding such as to allow receiving of the engagement element in the engagement opening for enabling said engaging.

5. Device according to claim 4, wherein the gripper comprises a rotatable extension comprising the engagement element, and wherein the engagement element and the engagement opening are correspondingly shaped in such a manner that the engagement element fits through the engagement opening in a first rotational position of the engagement element while enabling said engaging in a second rotational position of the engagement element.

6. Device according to claim 5, wherein the engagement element and the engagement opening are shaped as a polygon, such as a triangle, a square or rectangle, a pentagon, a hexagon, a heptagon, an octagon, or another polygon.

7. Device according to claim 1, wherein the gripper and the heads comprise a mutually cooperating engagement structure forming a kinematic mount, the kinematic mount including at least three structural elements arranged on either one of the gripper or the heads, said at least three structural elements cooperating with at least three slots arranged on another one of the gripper or the heads.

8. Device according to claim 6, wherein said at least three structural elements or at least three slots are arranged in one or more corners of said polygon shape of the engagement element and the engagement opening.

9. Device according to claim 7, wherein said gripper is arranged for maintaining the heads in a tilted orientation relative to the reference surface during motion of the heads towards and away from the support structure.

10. Device according to claim 9, wherein the gripper comprises three fingers, each finger comprising a clamping member for defining a contact point with a respective head during said engaging, wherein each of said fingers is connected to the gripper via a releasable connection, wherein the releasable connection is operable via mechanical contact transfer through the respective finger for allowing fixation or movement of the finger with respect to the gripper dependent on contact of the respective head with the support structure.

11. Device according to claim 10, wherein the releasable connection comprises a magnetic element.

12. Device according to claim 1, wherein the device is a scanning probe microscopy device, such as an atomic force microscopy device.

13. Method of measuring and/or modifying surface features and/or sub-surface features on or below a surface of a sample, wherein the method is performed using a device comprising:
- a sample carrier for supporting the sample, a support structure comprising a reference surface, and one or more heads including at least one of surface measuring equipment or surface modification equipment, the heads being separate from the sample carrier and the support structure;

the method comprising:

placing, using a pick and place manipulator, the one or more heads at a plurality of working positions on the reference surface of the support structure; and performing said measuring and/or modifying of surface features by said surface measuring equipment or surface modification equipment on said heads;

wherein the step of placing the one or more heads comprises:
- engaging with a respective one of the heads using a gripper;
- moving the gripper and the reference surface relative to each other using an actuator of said manipulator, in a direction transverse to the reference surface; and
- releasing the respective heads from the gripper at the respective working positions for placing the heads onto the reference surface.

14. Method according to claim 13, further comprising, prior to the step of performing the measurement of modification of the surface features, moving, using a stage actuator, the support structure relative to the sample carrier in a direction parallel to the reference surface, said moving being performed between at least a first position allowing said measuring and/or modifying of the surface features, and a second position allowing placement and removal of the heads onto and from said working positions.

15. Method according to claim 13, wherein the step of engaging comprises receiving an engagement element of at least one of the gripper or the respective head in a correspondingly shaped engagement opening in another one of the gripper or the respective head, said respective one of the engagement element or engagement opening being located on an upper side of the heads.

* * * * *